(12) United States Patent
Picard (10) Patent No.: US 12,258,119 B2
(45) Date of Patent: Mar. 25, 2025

(54) CONTROL UNIT RESISTIVE AND LOCKING SYSTEM

(71) Applicant: Ratier-Figeac SAS, Figeac (FR)

(72) Inventor: Pierre-Alex Picard, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 18/511,275

(22) Filed: Nov. 16, 2023

(65) Prior Publication Data

US 2024/0166337 A1    May 23, 2024

(30) Foreign Application Priority Data

Nov. 22, 2022    (EP) .................................... 22306716

(51) Int. Cl.
| | | |
|---|---|---|
| *B64C 13/14* | (2006.01) | |
| *B64C 13/04* | (2006.01) | |

(52) U.S. Cl.
CPC .......... *B64C 13/14* (2013.01); *B64C 13/0421* (2018.01); *B64C 13/044* (2018.01)

(58) Field of Classification Search
CPC ... B64C 13/14; B64C 13/0421; B64C 13/044; B64C 13/28; B64C 25/44; F16D 27/02; F16D 28/00
See application file for complete search history.

(56) References Cited

U.S. PATENT DOCUMENTS

| | | | |
|---|---|---|---|
| 11,084,571 | B2 | 8/2021 | Ezran et al. |
| 11,396,362 | B2 | 7/2022 | Voiles et al. |
| 2003/0183728 | A1 | 10/2003 | Huynh |
| 2017/0001714 | A1 | 1/2017 | Piaton |
| 2017/0029092 | A1 | 2/2017 | Gemmati et al. |
| 2018/0339763 | A1 | 11/2018 | Marini et al. |
| 2019/0257400 | A1* | 8/2019 | Boudreau ............... B60L 50/60 |
| 2020/0055588 | A1 | 2/2020 | Ezran et al. |

FOREIGN PATENT DOCUMENTS

CN    106132823 A    11/2016

OTHER PUBLICATIONS

European Search Report for Application No. 22306716.6, mailed May 8, 2023, 5 pages.

* cited by examiner

*Primary Examiner* — Valentina Xavier
(74) *Attorney, Agent, or Firm* — CANTOR COLBURN LLP (57) ABSTRACT

A resistive and locking system for locking rotation of a shaft. The system includes a housing defining an axis AX therethrough. The housing includes a drive shaft mounted in the housing and extending axially from a bottom end of the housing and a first stage comprising a resistive mechanism provided in the housing. The housing also includes a second stage comprising a locking mechanism arranged in the housing above the first stage. The locking mechanism is biased axially to frictionally engage with and lock the first stage mechanism to prevent rotation of the drive shaft, the locking mechanism including a magnetic unlocking mechanism configured to remove the frictional engagement with the first stage on application of power to the locking mechanism.

16 Claims, 5 Drawing Sheets

CONTROL UNIT RESISTIVE AND LOCKING SYSTEM

CROSS REFERENCE TO RELATED APPLICATIONS

This application claims priority to European Patent Application No. 22306716.6 filed Nov. 22, 2022, the entire contents of which is incorporated herein by reference.

TECHNICAL FIELD

This disclosure relates to a resistive and locking system (RLS) for pilot control mechanisms in an aircraft, and in particular to a RLS for a pedal mechanism.

BACKGROUND

Aircraft typically include a number of pilot control mechanisms for steering and braking an aircraft, including sticks (joysticks) and pedals. Movement of these mechanisms by the pilot is transferred to corresponding movement of parts of the aircraft that affect the direction of movement of the aircraft.

Pedal mechanisms in aircraft permit braking and rudder control of the aircraft. Such mechanisms generally include a left pedal and a right pedal for actuation by the foot/feet of a pilot. The pedals are connected via rods to a shaft and load applied to the pedals causes a corresponding rotation of the shaft. The rotational position of the shaft is used to provide a signal to the moving parts of the aircraft such as the nose wheel or rudder. For example, pressing the left pedal will cause the nose wheel or rudder to move to cause the aircraft to move to the left and pressing the right pedal will cause the nose wheel or rudder to move to cause the aircraft to move to the right. The left and right pedals are connected by a rod such that pushing on the left pedal will cause the right pedal to come towards the pilot and vice versa. Such a pedal unit may be used to steer the aircraft whilst on the ground and also to move the vertical fin, during flight, about the yaw axis. The pedals may also be operated to brake the main gear. One example of a pedal mechanism will be described in some detail below, but this is just one example, and other types of pedal mechanism are known. In addition, movement of the aircraft can be controlled by the pilot manually moving a control stick.

Typical pedal units may also include a feeling device which biases the pedal to the neutral position. The feeling device is typically a coiled spring configured to bias the pedal to the neutral position and to provide feedback to the pilot. A sensor may also be provided to detect the angle of the shaft relative to the neutral position and to provide information to the aircraft.

Other control mechanisms, such as sticks, may also have a similar feeling device with a damped spring to return the device to the neutral position.

Typically, such manual controls are only used at certain stages of flight, e.g. during taxiing, take-off, ascent, descent and landing. During the cruising stage of the flight, it is common for the aircraft to be controlled in autopilot mode. When in autopilot mode, it is desirable for the position of the pedal/stick devices to be locked or at least made more difficult to move, to avoid any inadvertent operation. Generally, in autopilot mode, the pedals/sticks etc. would be locked at the neutral position. In some cases, the aircraft may be provided with a trim mechanism that allows the pedals/stick to be set to a trim position, offset from neutral, if the desired direction is required to be in a particular yaw offset. This may be the case, for example, if one of the aircraft engines has failed or if there is a strong side wind, in which case, the default direction of the nose/rudder/fin is required to be off-neutral.

Where the control mechanism has a locking mechanism for locking the pedals etc. when in autopilot mode, it is necessary (to satisfy current industry and safety criteria) that the locking can be overridden if required during flight. Various ways are known of providing the locking feature.

A damper mechanism may also be provided to smooth the response of the spring to avoid a bumpy or jarring movement of the pedal.

Such mechanisms are often complex and occupy a large amount of cabin space. Furthermore, the autopilot locking mechanisms are typically activated when power is applied. As, particularly for longer flights, the autopilot is on for a large part of the flight, the locking mechanism consumes power over a long period of time.

There is, therefore, a need for a locking mechanism that is more compact and consumes less power.

SUMMARY

According to a first aspect, there is provided a resistive and locking system (RLS) for hindering the rotation of a shaft and locking rotation of the shaft. The system includes: a housing defining an axis AX therethrough. The housing includes: a drive shaft mounted rotatably in the housing along the axis and extending axially from one end of the housing; a first stage comprising a resistive mechanism provided in the housing around the drive shaft and configured to hinder rotation of the drive shaft relative to the housing, the resistive mechanism has interacting stator and rotor parts, the rotor part being fixed to the drive shaft and the stator part being fixed to the housing; a second stage comprising a locking mechanism arranged in the housing axially above the first stage, the locking mechanism being in a default configuration biased axially to frictionally engage with and lock the rotor part of the resistive mechanism to prevent rotation of the drive shaft, the locking mechanism including a magnetic unlocking mechanism configured to remove the frictional engagement with the resistive mechanism on application of power to the locking mechanism.

Whilst the resistive mechanism can be a friction mechanism for applying resistance force to the drive shaft, in other examples a damper mechanism is provided within the housing as a resistive mechanism to smooth the rotation of the drive shaft relative to the housing, as an alternative or in addition to the friction mechanism The locking mechanism can act directly on the friction mechanism for applying resistance force to the drive shaft. In the embodiment where the resistive mechanism is a damper mechanism, the locking mechanism is provided above the damping mechanism and is axially biased to frictionally engage with and lock the resistive mechanism— i.e. frictionally engaging with and locking the damper mechanism.

In an example, the damper mechanism includes an upper surface, e.g. a flying disk, arranged to rotate relative to the housing and being in engagement with the drive shaft such that rotation of the drive shaft causes rotation of the upper surface, and wherein the locking mechanism includes a lower surface, e.g. a friction plate, rotationally fixed relative to the housing, that is biased, i.e. when power is not applied to the locking mechanism, to frictionally engage with the upper surface of the damper mechanism to prevent rotation of the upper surface, the lower surface configured to move axially away from frictional engagement with the upper surface on application of power to the locking mechanism.

The locking mechanism may be biased axially to frictionally engage with and lock the friction and/or the damper mechanism by means of at least one spring.

The locking mechanism may include a magnetic unlocking mechanism that may include an electric coil that, when power is applied to the locking mechanism, generates a force to overcome the axial bias to remove the frictional engagement.

The damper mechanism, where present, may be a conventional magnetic damper mechanism comprising a magnetic rotor and a magnetic stator. A plurality of magnets are mounted onto the rotor such that when the rotor rotates relative to the stator, a resistive magnetic force, opposed to shaft rotation, is generated to apply a damping force to the drive shaft. As an alternative, the plurality of magnets are mounted onto the stator such that when the rotor rotates relative to the stator, a resistive magnetic force, opposed to shaft rotation, is generated to apply a damping force to the drive shaft. Other damper configurations and technologies may also be used as mechanical or fluid dampers. In the absence of a damper mechanism, the resistive mechanism may be provided by a friction device acting on the drive shaft. The resistive mechanism may be a friction mechanism e.g. a friction plate, a magnetic friction, installed on the rotor itself or a belt friction acting directly on the drive shaft as known in the prior art. For all dampers or friction devices, any functional part associated with the stator can, instead, be installed on the rotor and functional parts associated with the rotor can be installed on stator. The resistive mechanism may comprise both a friction mechanism and a damper mechanism.

The RLS is preferably for use with a control unit of an aircraft, such as a pedal unit or a stick unit. The drive shaft may be connected to the rotating shaft of the control unit by a gear train. A controller may provide control signals to the RLS to control the application of power to unlock the resistive mechanism according to various selected rules.

BRIEF DESCRIPTION OF THE FIGURES

Embodiments will be further described and explained by way of example with reference to the accompanying drawings in which.

DETAILED DESCRIPTION

In the description, the terms "above" and "below" are only to be considered as relative terms aimed at easing the comprehension of the internal arrangement of the device. The described resistive and locking system (RLS) when in use may be installed in any position (i.e. vertical, horizontal, inclined, upside down etc).

Some known pedal and brake units will be first described by way of background. It should be noted, however, that these are just examples of systems with which the resistive and locking system (RLS) of the disclosure can be used. The system could be used with other types of pedal system or also with other types of steering or control systems such as sticks.

Figure 1:
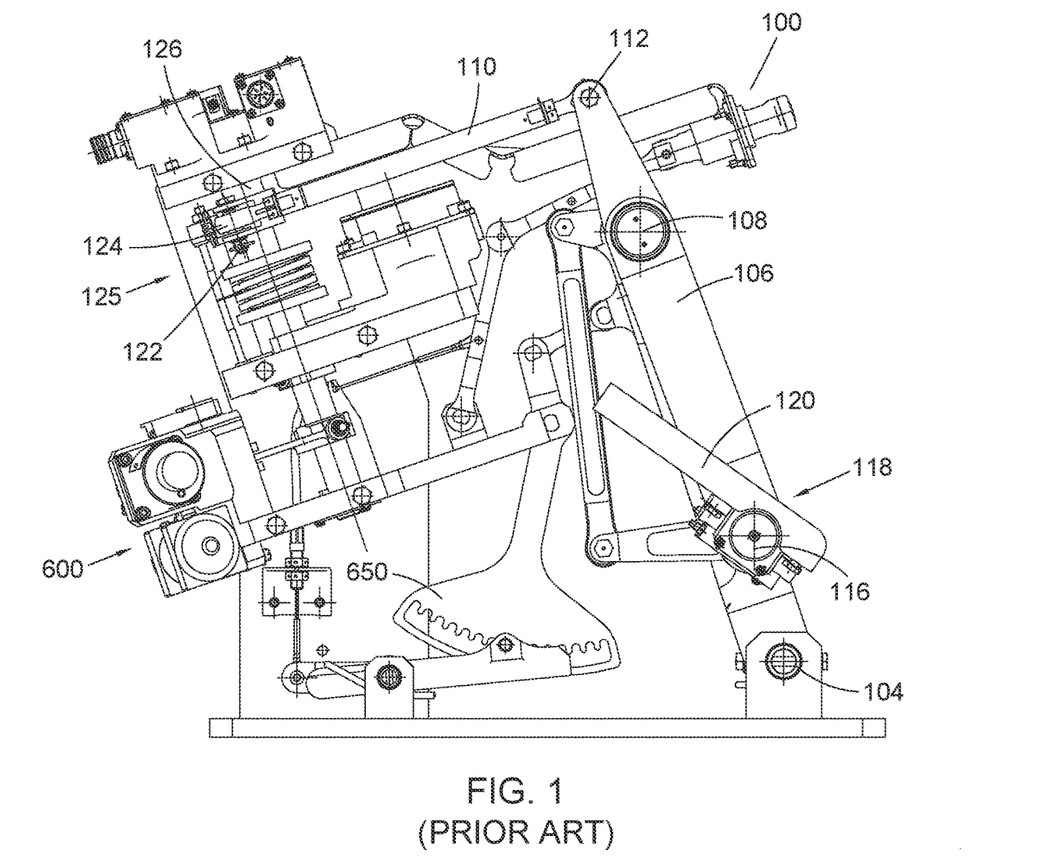
FIG. 1 shows an example of a pedal unit as known in the art.

FIG. 1 shows a known pedal unit for providing steering and braking to a rudder (referred to as a rudder and brake pedal unit (RBPU)). The pedal mechanism 100 includes two (or more) pedals 120, 120a each of which comprises a pedal arm 106 and a rod 110.

The first end of the pedal arm 106 is rotatably connected to the second end of the rod 110 at pedal arm fixing point 112. The second end of the pedal arm 106 is connected to a pedal cartridge 118 at pedal connection point 116. A pedal 120 of the pedal cartridge 118 is rotatably connected to the pedal arm 106 at pedal connection point 116. Pedal arm fixing point 112 is positioned above a fixed point 104 of the pedal arm and the pedal arm rotation point 108 in use.

The pedal mechanism 100 comprises a translation sensor which comprises a rod connector 124. The rod connector 124 is a crank 124. The rod 110 is rotatably connected to the rod connector 124 at a rod connector point 122, which is on the first end of the rod 110. The rod connector 124 permits rotation of the rod 110 about the rod connector point 122 about two axes normal to the rod 110. The translation sensor 125 further comprises a translational feeling device (not shown), which provides feedback to the pilot in response to turning of the shaft 126.

In use, during an aircraft movement control process (e.g. during taxi) a pilot provides a translation input to the pedal 120 by pressing the left (120) or right (120a) pedal.

The translation input to the pedal 120 causes the pedal arm 106 to rotate about the pedal arm rotation point 108. This in turn causes movement of the pedal arm fixing point 112, in the opposite direction to the movement of the pedal 120, due to the pedal 120 and the pedal arm fixing point 112 being on opposite sides of the pedal arm rotation point 108. The rod 110 therefore translates (also in the opposite direction to the pedal 120), causing rotation of the crank 124 and the shaft 126. The translation sensor 125 detects the rotation of the shaft 126 to detect the translation of the pedal from the translation neutral position, and in response, outputs a translation signal (e.g. a rudder signal, so that the pedal mechanism 100 may be used to steer the aircraft left (or right) on a yaw axis of the aircraft). During this process, the translational feeling device provides a force in response to the translational movement, biasing the pedal back to its translational neutral position. In the translational neutral position, the translation sensor does not output the translation signal.

As mentioned above, a damper mechanism may also be provided to smooth the response of the spring to avoid a bumpy or jarring movement of the pedal.

The pedal cartridge 118 may also comprise a sensor which, during a braking action detects rotation of the pedal 118 about the pedal axle X from the rotational neutral position (e.g. during the aircraft movement control process) and in response sends a braking signal to the aircraft. When pedal 120 is in the rotational neutral position no braking signal is sent to the aircraft.

When it is desired to apply an aircraft brake, i.e. to reduce a speed of the aircraft, the pilot pushes on the top of the pedal 120, such that the pedal 120 rotates about the pedal axle X from the rotational neutral position. The sensor detects this rotation and determines the amount of braking to apply based on the degree of rotation of the pedal 120 relative to the pedal axle X from the rotational neutral position. The sensor sends an appropriate braking signal to the aircraft.

The pedal axle may comprise a feeling device 704 which biases the pedal 120 to the neutral position during braking and provides feedback to the pilot.

Figure 2:
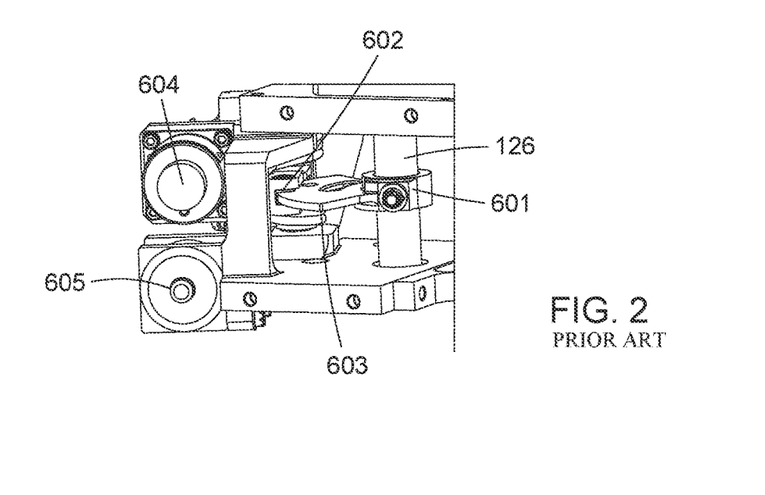
FIG. 2 shows, in more detail, a known autopilot locking mechanism as used, for example, in a pedal unit such as shown in FIG. 1.

Known systems include an autopilot locking system 600 as described above, an example of which is shown in more detail in FIG. 2. The purpose of the autopilot locking system is to lock the pedals in a neutral (or trim) position during autopilot operation of the aircraft, so that the pedal cannot be inadvertently operated e.g. by an accidental kick. Various locking mechanisms are known. The example here has a cam 601 provided on the rotating shaft 126. An opposing roller 602 is spaced from the shaft, in a default position, but when the lock is to be engaged, the roller is moved to engage with the cam on the shaft and prevent rotation of the shaft. In the example shown, the roller is held in its default position by means of a solenoid 604, and can be moved to engagement by means of the solenoid 604 operated magnetic device 605 that when powered on by energizing the solenoid 605, enables the magnetic device, and thus the roller 602, to move into locking engagement with the cam.

To satisfy safety requirements, the locking mechanism 600 must be able to be overridden by a user. In one example, this can be provided by adding a spring (603) biased to the unlocked position. As an example, a sensor may detect angular rotation of the shaft beyond, say, 30 deg. (as an example only) whilst in autopilot mode, and unlock the locking mechanism. Other mechanisms can be used to unlock the locking mechanism.

The example shown in FIGS. 1 and 2 also includes a stature lock system 650. Not all pedal units will incorporate this feature, and this will not be described further.

In the example shown, in autopilot mode, the pedals are locked in the neutral position. The pedal unit may, however, also include a trim mechanism to enable the pedals to be locked in a trimmed (off-neutral) position as described above.

As can be seen, the various mechanisms in the pedal unit, including the locking mechanism, the damper mechanism and the trim mechanism and stature lock system, where provided, are all relatively complex and bulky arrangements which require a relatively large envelope for the overall pedal (or other control) unit. As these units are located in the cockpit where the pilot sits, space is constrained, and it would be desirable to have a smaller, more compact unit. Further, as mentioned above, power is required to lock the system in autopilot mode and so the system is consuming power for a large part of the flight in most cases. Again, a reduction in power consumption would also be desirable.

Figure 3:
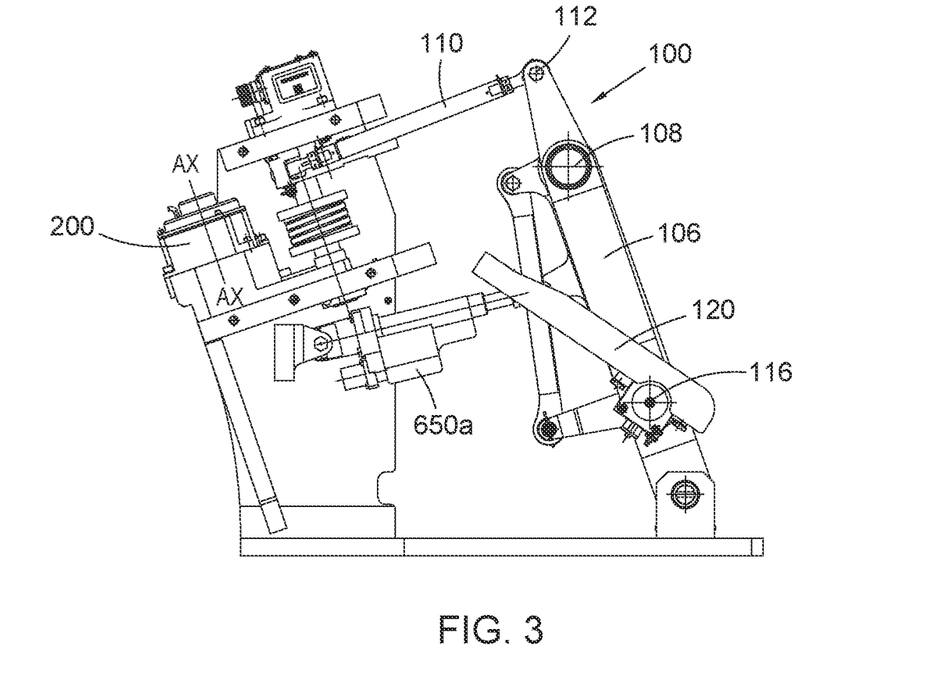
FIG. 3 shows an example of a pedal unit incorporating a locking mechanism and a damper according to one example of the disclosure, in an example in which the pedals are locked, in autopilot mode, to the neutral position.
Figure 4:
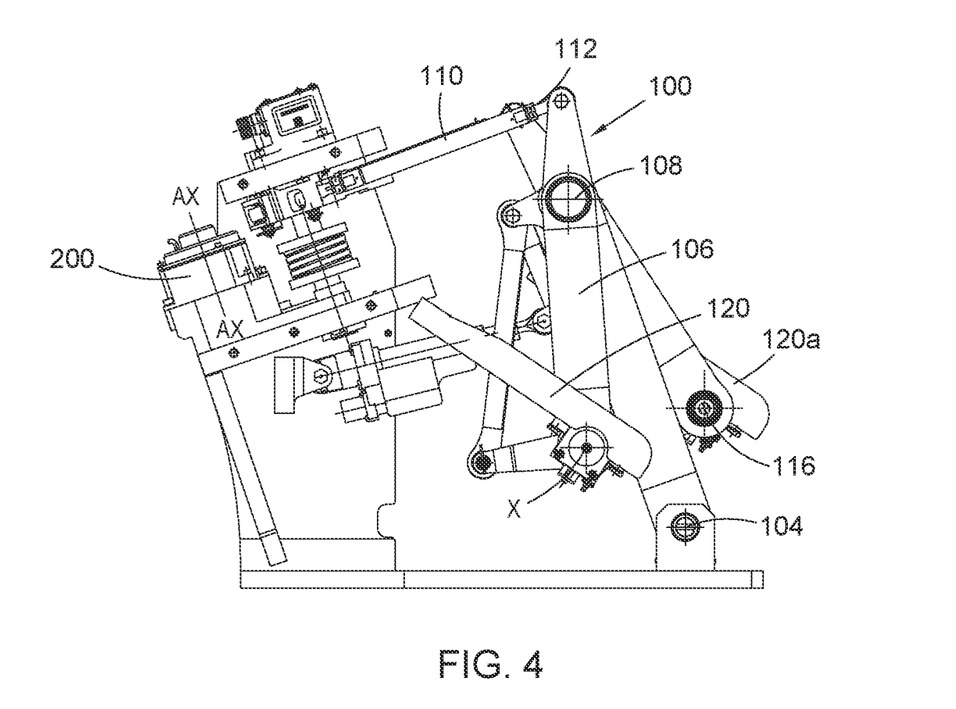
FIG. 4 shows an example similar to that of FIG. 3, but also include a trim mechanism, such that the pedals are locked to a trim position rather than the neutral position.

According to the present disclosure, the locking mechanism is provided together with the resistive mechanism that applies resistance force to the drive shaft in a common housing, as shown in FIGS. 3 and 4 and as described in more detail below. Further, the RLS is configured such that the locking mechanism is passive—i.e. is engaged when no power is applied and is disengaged when power is applied. The passive locking system that is combined with the resistive mechanism in a single unit will be described further, using some examples, with reference to FIGS. 3 to 10.

In the examples shown, a damper mechanism is provided in the first stage. Here the first stage hinders rotation of the shaft, as described above and as is known in the prior art, e.g. in autopilot operation, by applying mechanical resistance to rotation of the shaft. In the examples shown, the first stage resistive mechanism generates a damping provided to smoothen the spring response as described above. In other examples, however, the first stage may just include a friction mechanism to apply resistance force to hinder rotation of the shaft, without a damper mechanism, as the first stage. The first stage may also comprise a combination of a damper and a friction mechanism. Although such examples are not shown in the drawings, they are intended to be within the scope of the claims. The locking mechanism of the second stage provides locking to the first stage, whether the first stage includes a damper mechanism or another type of resistive mechanism.

FIG. 3 shows a pedal unit similar to that of FIG. 1, but having both the locking mechanism and damper mechanism provided in a single housing 200 according to the present disclosure. This example also includes a stature actuator 650a for allowing adjustment of the pedals for users of different size and stature but this is a purely optional feature and will not be described further. The example of FIG. 3 shows the pedals being locked in a neutral position. In the example of FIG. 4, a trim function is provided, and the pedals are locked at a trim position. Again, the trim feature is optional. Here, the system in the housing 200 is shown in combination with a pedal unit such as that described in relation to FIG. 1 and the same reference numerals have been used for the pedal parts.

The locking and damper mechanism in housing 200 is a focus of this disclosure and will now be described with reference to the examples shown in FIGS. 5 to 9.

Figure 5:
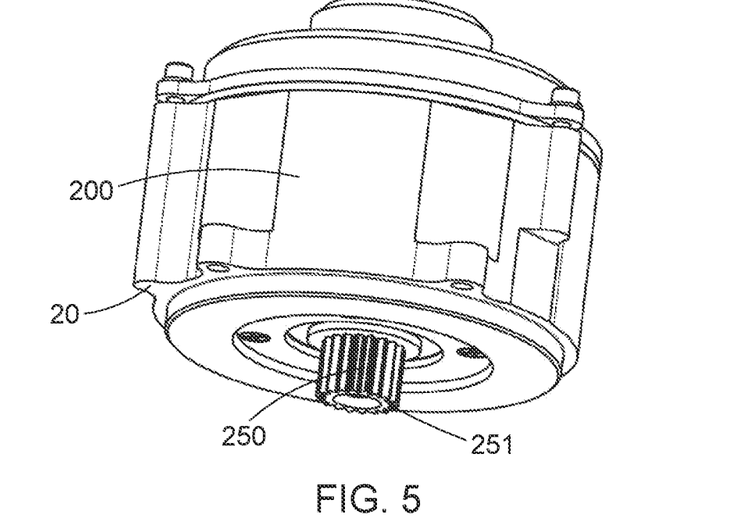
FIG. 5 shows a locking and damper system in accordance with an example of this disclosure.
Figure 10:
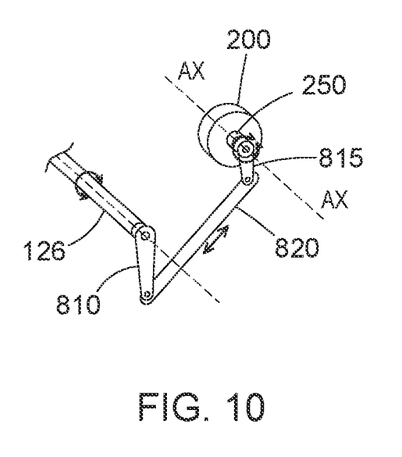
FIG. 10 shows one non-limiting example of a RLS connected to a shaft by cranks and a rod (as an alternative to gear trains).

FIG. 5 shows an example of the system housing 200 containing damper and locking mechanisms. In the example shown, the housing has a substantially circular cylindrical outer shape although other outer shapes may be more appropriate depending on the design and application of the control unit and cockpit. In the example shown, flanges 20 are provided for allowing attachment of the housing to other structure. The locking and damper mechanism, described further below, is arranged inside the housing. A shaft 250 extends from the locking and damper mechanism from the housing and is provided with means such as teeth 251 for engagement with the shaft 126 of the control unit e.g. pedal unit. The shafts can be engaged with each other via a gear mechanism to provide a desired gear ratio or alternatively by rods connected to cranks (as shown in FIG. 10).

In other examples of the locking mechanism of the disclosure, the system does not include a damper mechanism in the first stage but, instead, the first stage is a resistive mechanism which is configured to apply friction to the drive shaft (and, in turn) to a control member to which the drive shaft is connected (e.g. via a gear box).

The RLS in the embodiment combining damper and locking mechanisms will now be described with reference to the examples shown in FIGS. 5 to 10.

The components of the combined mechanism are all mounted inside a single housing 200 such as that shown in FIG. 5. The axis through the housing is identified by AX and directions and orientations and locations are defined relative to that axis in the description. Power is provided to the mechanism inside the cable and this may be by means of a power cable 201 (connected, in use, to a power source (not shown)) extending through the housing 200. As mentioned above, a driving shaft 250 extends from the housing 200 for connection to the rotating shaft of the control unit e.g. a pedal unit, for example via a gear trains 700.

Figure 6:
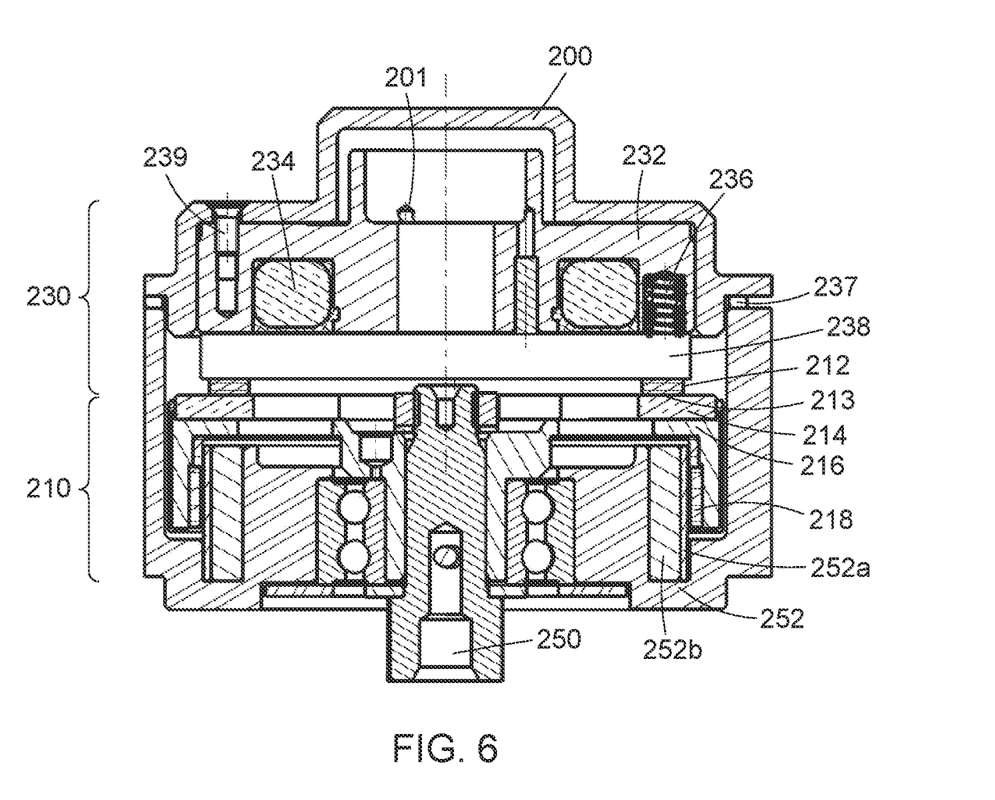
FIG. 6 is a cross section of a locking and damper system in accordance with an example of the disclosure.

The mechanism inside the housing 200 comprises two stages: a first stage 210 for applying resistance force to the shaft (in this case a damper mechanism 210) and a magnetic locking system 230, as a second stage. The structure of the first stage in the form of a damper mechanism 210 is conventional and will be described briefly here. With reference to FIG. 6, the driving shaft 250 is linked to a rotor 216. Magnetic rotor 216 is equipped with magnets 218 radially magnetised and alternatively assembled north and south around the circumference of the rotor. A magnetic stator 252 is made of an electrically conductive ring 252a which on the radially inner side faces the magnets 218 and on the radially outer side is embedded into a magnetic recirculation ring 252b provided inside the housing 200. When the rotor 216 is rotating, its magnets 218 facing the stationary stator 252 generate a magnetic flux variation in the electrically conductive ring 252a. This magnetic flux variation generates Eddy currents in the electrically conductive ring 252a. Eddy currents creates a resistive damping torque to smoothen the motion of the shaft 250 relative to the housing 200. Alternatively, the magnets 218 could be replaced with drivable coils which allows to adjust the damping torque generated. Alternatively, magnets 218 could be arranged on the stator and then the electrical conductive ring 252a and the magnetic recirculation ring 252b could be on rotor, keeping the electrical conductive ring 252a between the magnets 218 and the magnetic recirculation ring 252b.

Alternatively, with reference to FIG. 6 where magnets 218 are radially magnetised, magnets 218 could be axially magnetised along AX. In this case, magnetic stator 252 shall be also assembled axially, keeping electrically conductive ring 252a between magnets 218 and magnetic recirculation ring 252b. For example, rotor 216 and magnetic recirculation ring 252b could be made of martensitic stainless steel or iron alloy with a high magnetic permeability, magnets 218 could be made of rare earth material or Al—NiCo alloys or ferrite, conductive ring 252a could be made of aluminium or copper alloys or any alloys with a high electrical conductivity.

Alternatively, an electromechanical damper mechanism, made of a synchronous generator connected to an electrical load, may form the first stage. Electrical load can be drivable to adjust the damping torque generated.

Alternatively, a fluid damper mechanism, as known in the art, may form the first stage.

Alternatively, a simple friction mechanism, as known in the art, may form the first stage.

The magnetic locking mechanism, i.e. the second stage, is located above the first stage e.g. the damper mechanism within the housing 200, as shown and is configured to lock the first stage in its default state when no power is applied and to unlock the first stage when power is applied. The locking mechanism engages with the first stage e.g. the damper mechanism via friction created by the locking mechanism pushing a friction plate 212 against the damper mechanism 210 (here against a flying disk 214 of the damper mechanism) and is disengaged by removing that frictional engagement.

The locking mechanism includes a locking mechanism housing part 232 within which is mounted an electrical coil 234 and one or more springs 236. A disk 238 is provided at the bottom of the locking mechanism housing part 232 in engagement with the spring(s) 236. The disk 238 is moveable relative to the locking mechanism housing part 232 under the force of the spring(s) 236. The disk 238 contacts the friction plate 212 that creates the frictional engagement with the first stage e.g. the damper mechanism.

Pins 239 or other fasteners may be provided to secure the components in position in the housing 200. Adjusting shims 237 may be used to fill in any spaces between the inter-engaging parts to provide a robust and integral system and provide a fine tuning of the gap between the friction plate 212 and the flying disk 214.

Figure 7:
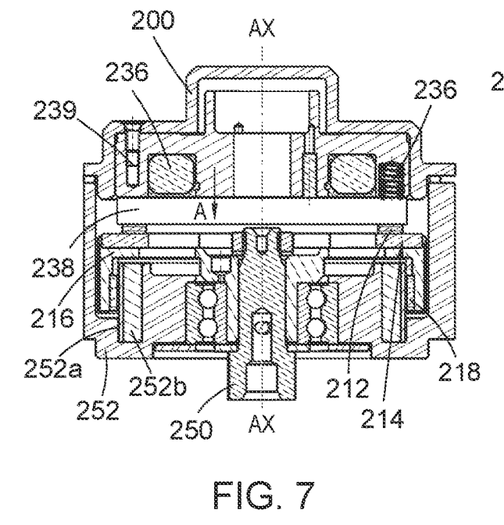
FIG. 7 shows the mechanism of FIG. 6 when in the locked state.

The spring 236 is configured such that in its default state it forces the disk 238 in direction AX to push against the friction plate 212 to create frictional engagement 213 with the damper mechanism 210 (here via the flying disk 214) so as to engage the locking mechanism to lock the shaft, and thereby the control members e.g. pedals in the autopilot position (neutral or, if trimmed, the trim position). This state is shown in FIG. 7.

Due to the requirement that, in an emergency, the locking must be capable of being overridden, the force of the spring 236 will be selected or set so that it is just sufficient to create the frictional engagement to lock the first stage/damper but that the spring force can be overridden by user, e.g. pilot, force to allow sliding between the friction plate 212 and the flying disk 214.

Figure 8:
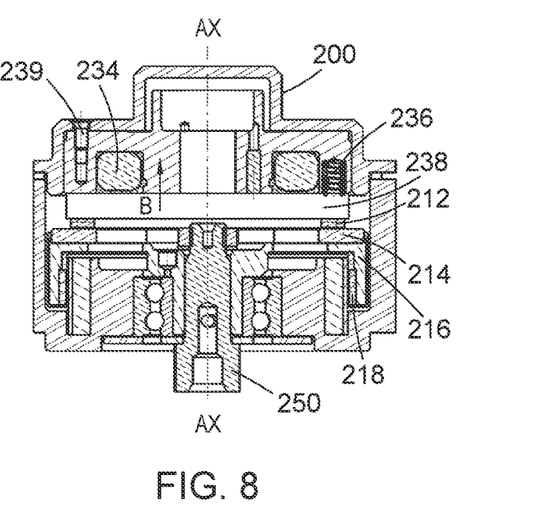
FIG. 8 shows the mechanism of FIG. 6 when in the unlocked state.

When the locking of the pedals/stick etc. is to be unlocked such that, the pilot can control the aircraft manually, the locking mechanism is unlocked by applying power to the locking mechanism (here via the power cable 201). This causes the electrical coil 234 to generate a magnetic force that attracts the disk 238 towards the electrical coil 234 (in direction B), against the force of the spring(s) 236, as shown in FIG. 8, and thus away from the first stage so that there is no longer frictional engagement between the locking mechanism and the first stage and allowing free running of the damper mechanism. The pedals etc. are then free to be moved by the pilot to rotate the rotating shaft for control of the aircraft.

The actual control of the locking mechanism via the system of the disclosure—i.e. when the damper mechanism should be locked or unlocked—may vary depending on the requirements of the aircraft or pilot and control may be provided by the aircraft computers. For example, the computers may be programmed to: only lock the locking mechanism when the pedals/control member are in a neutral position; re-activating the unlocking of the damper during overriding of the locking, to avoid a 'friction' feeling; activating a trim state using a dedicated trim control panel, where the pilot moves the pedals to a desired trim position and the pedals are then locked in that position; deactivating the locking when the aircraft speed is lower that a predetermined threshold; deactivate the locking when a parking brake lever is activated. These are just some examples of the rules that could be set for activation of the system of the disclosure. Alternatively, any other electromagnet embodiment used to move the friction plate 238 thanks to a magnetic core can be used.

Furthermore, because friction value in the locking system is directly linked to the difference in axial force generated by biasing spring and the force generated by voltage/current level in the coil, in an embodiment, control laws of the locking mechanism of the disclosure can drive engaging/disengaging speed by current control laws (i.e. control current gradually applied or removed from the locking mechanism) as an example, to slow down the control unit behaviour change during engaging/disengaging of the locking mechanism. As an example, if the pilot sets up a trim position on the pedals, and then wants to release the trim position, the pedals would be driven back to neutral position by the spring feeling device. Disengaging speed would be slowed down by the current law of the locking mechanism, which would avoid a bumpy effect of the spring feeling device: pedals would come back to the neutral position gently. Indeed, coil current control law may be configured such that it allows maintenance of a level of friction in the mechanism, generating a force opposing the forces of the spring feeling device driving the pedals back to neutral. This results in slowing down the pedal return movement and this, in addition to the damper forces. This avoids rebounding of the pedals that would result in oscillatory command of aircraft rudder surface and potential aircraft control stability issues.

Figure 9:
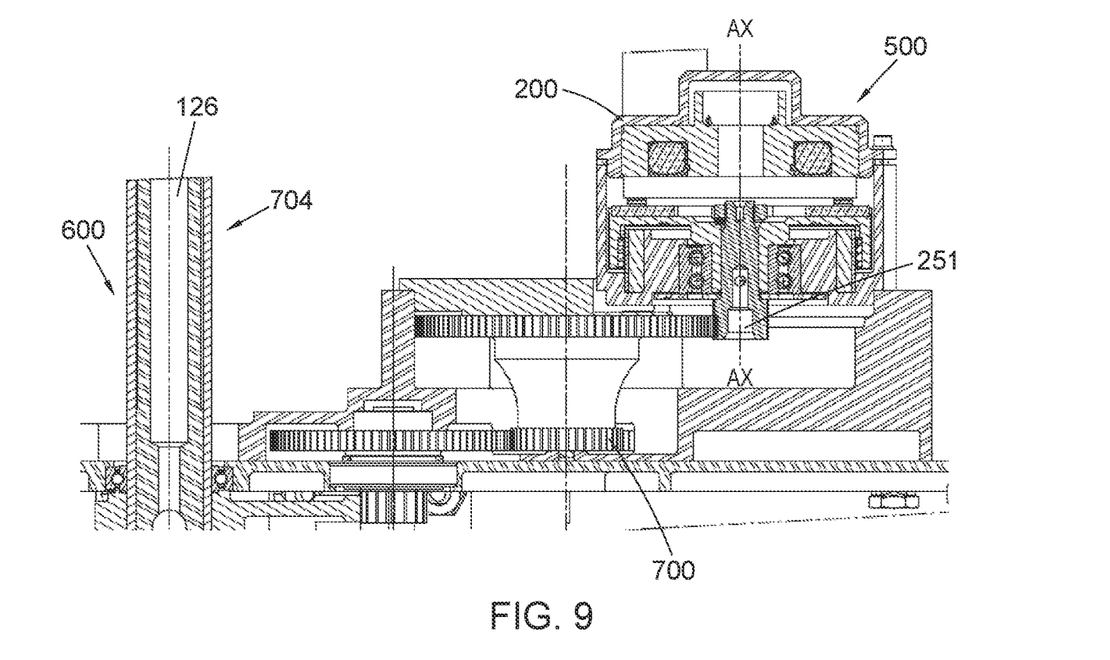
FIG. 9 shows, in cross-section one non-limiting example of a locking and damping mechanism, in accordance with an example of the disclosure, in connection with one example of a pedal unit.

FIG. 9 shows one non-limiting example of a locking and damper system 500 such as described above used with a pedal unit 600 of an aircraft.

The locking and damper system 500 is as described above and the driving shaft 250 is engaged with the rotating shaft of the pedal unit 600 via gear trains 700. When activated, the damper mechanism, via the gear trains, prevents rotation of the rotating shaft of the pedal unit e.g. in the manner described in the introduction.

FIG. 10 shows an alternative to gear trains by using a crank 810 fixed to control unit shaft 126. Crank is linked by a rotation axis to a rod 820 which is linked by a rotation axis to a crank 815 fixed to the shaft 250 of the locking and damper system 200. When the shaft 126 is rotated, the crank 810 pulls or pushes the rod 820 and moves the crank 815 which rotates shaft 250.

If required, it would also be possible to have the locking mechanism as two separate lines of powering for redundancy. If one line were to fail, the other line would maintain the locking function. In that case, both lines could be operated at the same time, and then one would continue to operate in the event of failure of the other, or, alternatively, one line could be operated as the 'main' line, with the other line only kicking in if the main line fails.

As mentioned several times above, the RLS of this disclosure can be used with many different control units including different types of pedal unit or other units such as sticks used by a pilot to control an aircraft. It is also expected that the resistive and locking system of the disclosure could be retro-fitted to existing control systems that include autopilot locking features and, optionally, damper and/or trim features. The housing of the resistive and locking system can be designed to have the same external interface as existing dampers so that it can be retrofitted as a replacement for the existing dampers.

By using a passive locking mechanism (that may also be known as a power-off brake or POB) that engages the resistive mechanism when no power is applied and only requires power to deactivate the locking mechanism, such that the default state of the system is locked, power consumption is reduced compared to existing active locking systems that require power to be on to lock the controls. Alternatively, active locking mechanism (that may also be known as a power-on brake), could be used. Benefits of power consumption reduction would be lost, however the advantage of system compacity would remain.

By combining the resistive and locking mechanisms into a single system in one housing, the locking mechanism engaging directly with a rotating part of the resistive mechanism, the envelope and also the weight of the mechanism is reduced compared to the two separate mechanisms of the known arrangements. By adding the locking mechanism on top of the damper mechanism in a combined system, and because of the driving gear ratio between the mechanism and the control member rotating shaft, the size of the system can be minimised.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A resistive and locking system for hindering the rotation of a shaft and locking rotation of the shaft, the system comprising:

a housing defining an axis AX therethrough, the housing containing:

a drive shaft mounted rotatably in the housing along the axis and extending axially from one end of the housing;

a first stage comprising a resistive mechanism provided in the housing around the drive shaft and configured to hinder rotation of the drive shaft relative to the housing, the resistive mechanism has interacting stator and rotor parts, the rotor part being fixed to the drive shaft and the stator part being fixed to the housing; and a second stage comprising a locking mechanism arranged in the housing axially above the first stage, the locking mechanism being in a default configuration biased axially to frictionally engage with and lock the rotor part of the resistive mechanism to prevent rotation of the drive shaft, the locking mechanism including a magnetic unlocking mechanism configured to remove the frictional engagement with the resistive mechanism on application of power to the locking mechanism.

2. The resistive and locking system of claim 1, wherein the first stage resistive mechanism rotor part includes a damper mechanism including an upper surface arranged to rotate relative to the housing and being in engagement with the drive shaft such that rotation of the drive shaft causes rotation of the upper surface, and wherein the locking mechanism includes a lower surface, rotationally fixed relative to the housing, that is configured to be axially biased when power to the locking mechanism is off to frictionally engage with the upper surface of the damper mechanism to prevent rotation of the upper surface, the lower surface configured to move axially away from frictional engagement with the upper surface on application of power to the locking mechanism.

3. The resistive and locking system of claim 1, wherein the resistive mechanism includes a mechanism for applying friction to the drive shaft.

4. The resistive and locking system of claim 1, wherein the locking mechanism is biased axially to frictionally engage with and lock the first stage by means of at least one spring.

5. The resistive and locking system of claim 1, wherein the magnetic unlocking mechanism includes an electric coil that, when power is applied to the locking mechanism, generates a force to overcome the axial bias to remove the frictional engagement.

6. The resistive and locking system of claim 2, wherein the lower surface of the locking mechanism is the lower surface of an axially moveable friction plate.

7. The resistive and locking system of claim 6, wherein the upper surface of the damper mechanism is the upper surface of a flying disk with which the moveable plate is biased to frictionally engage.

8. The resistive and locking system of claim 6, the locking mechanism further comprising an axially moveable disk arranged to axially release the friction plate, the friction plate being fixed to the moveable disk.

9. The resistive and locking system of claim 1, wherein the force biasing the locking mechanism into frictional engagement with the resistive mechanism is set to cause a frictional engagement between the locking mechanism and resistive mechanism such that it can be overridden by force from a user.

10. The resistive and locking system of claim 2, wherein the damper mechanism comprises:
a rotor connected to the shaft and a magnetic stator; and
a plurality of magnets mounted onto the rotor such that when the rotor rotates relative to the stator, a resistive magnetic force is generated, providing a damping force to the drive shaft rotation.

11. The resistive and locking system of claim 2, wherein the damper mechanism comprises:
a magnetic rotor connected to the shaft;
a stator; and
a plurality of magnets mounted onto the stator such that when the rotor rotates relative to the stator, a resistive magnetic force is generated, providing a damping force to the drive shaft rotation.

12. The resistive and locking system of claim 1 configured for use with a control unit of an aircraft.

13. The resistive and locking system of claim 12, wherein the control unit is a pedal unit or a stick or a lever for controlling the aircraft.

14. An aircraft control unit for controlling of the aircraft, the control unit including:
one or more control members for operation by a pilot;
a rotating shaft rotated responsive to operation of the one or more control units; and
a resistive and locking system as claimed in claim 1, wherein the drive shaft is connected to the rotating shaft whereby locking of the drive shaft causes the rotating shaft to be locked against rotation.

15. The aircraft control unit of claim 14, wherein the drive shaft is connected to the rotating shaft by a gear train or a rod linked to cranks.

16. The aircraft control unit of claim 13, further comprising:
a controller for providing control signals to the locking mechanism to control the application of power to unlock the first stage mechanism.

* * * * *